Patented Nov. 15, 1927.

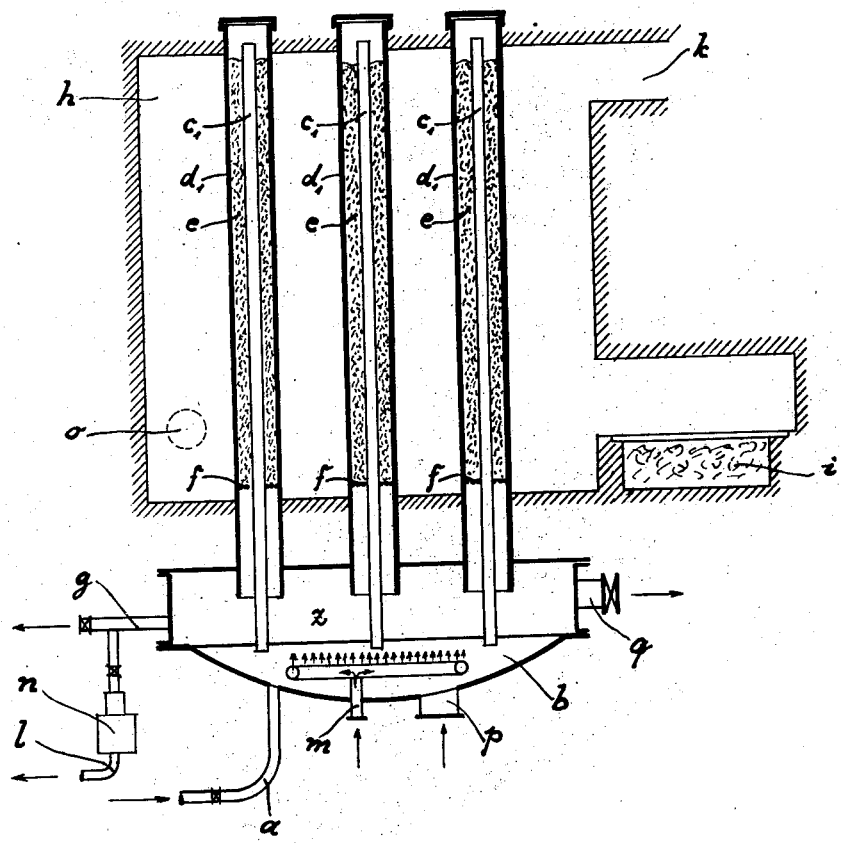

1,649,405

UNITED STATES PATENT OFFICE.

JOSEF HERRMANN AND MAX STAUBER, OF COLOGNE, GERMANY.

FILTER.

Application filed April 24, 1924, Serial No. 708,734, and in Germany May 22, 1923.

Our invention refers to filtration and it more particularly concerns the filtration of liquids by means of silicic acid ($SiO_2$). It is an object of our invention to provide means for effecting the filtration with the aid of silicic acid in a more perfect and economic manner than has hitherto been possible.

It is well known to free liquids of substances dissolved therein by filtration with the aid of silicic acid, but up till now this material has been used only in pulverized form in order to offer the largest possible surface area. The use of such filtering material involves the disadvantage of requiring permanent stirring and, in order to avoid losses of the liquid to be filtered, the silicic acid, after its filtering power is exhausted, must be freed from the liquid by extraction. Inasmuch now as the silicic acid is employed in pulverized form, this operation is connected with great difficulties, and it has therefore been necessary to employ presses, separators, rotary extraction apparatuses and the like, requiring a great expenditure of power, attendance and installation. The unavoidable losses of solvent also form an important factor.

It is possible, of course, to restore to the pulverized silicic acid its filtering power by distilling and calcining, but there again separate apparatuses are required for each operation.

A further material disadvantage consists therein that a smaller or larger quantity of the pulverized material will frequently be carried along by the liquid and, for instance in the case of lubricating oil, the fine powder will work damage in machinery and the like.

According to the present invention, we effect filtration by means of more or less coarsely grained silicic acid which is obtained by shaping and thereafter drying silicic acid gel containing less than 91 per cent water. The silicic acid gel can for instance be produced in a manner well known per se by mixing a dilute mineral acid such as for instance hydrochloric acid with sodium silicate until a neutral reaction is obtained, the concentration of the components being so chosen that the resulting liquid mixture contains from 5 to 10 per cent $SiO_2$. After some time this liquid mixture will set as a firm jelly-like mass or gel, which after having been comminuted in some suitable manner is then washed with water. The silica gel thus obtained is then shaped, by pressure or otherwise, into coarse grains or into rods which are broken up to form coarse grains, the granular material containing less than 91 per cent water and being now dried at temperatures between 100–200° C. By first shaping silica gel containing not more than 91 per cent water and drying the shaped material, a silica gel is imparted particularly advantageous adsorptive properties. The filtering effect of the grained silicic acid thus obtained is surprising and at least equal to that of pulverized silicic acid. Raw dark colored mineral oil distillates are converted by means of grained silicic acid into light colored refined products which can further be converted into high grade products. By the novel mode of filtration for instance the well known refining process by means of sulphuric acid and caustic soda, which is so clumsy and which entails heavy losses, can be rendered superfluous either partly or entirely.

This result could not be expected, inasmuch as the present invention conflicts with the present day ideas, according to which the filtering means must be employed in the finest possible form, preferably in colloidal form, in order to offer a larger surface area. The great advantage offered by the use of grained silicic acid consists, among others, in the low resistance which it offers to the passage of the liquid to be filtered. If pulverized material is used, it is necessary to permanently stir with great energy during filtration. In contradistinction thereto, filtration through grained silicic acid can be carried out without any mechanical movement. Moreover, in the present case, the filtrate is ready for direct use, while a filtrate which passes through pulverized material must be subjected to comparatively high pressure, a great amount of filtering cloths being spent in this operation.

A further advantage offered by the invention consists therein that the filtering material, after its filtering power is exhausted, can easily be regenerated, it being possible to regenerate grained silicic acid in the filtering apparatus itself, for instance by boiling with water, by the action of steam, by calcining, extraction and the like with subsequent drying. Thus, by using silicic acid obtained in the manner described, a great technical advantage is obtained by the great saving in power, time and apparatuses.

Filtration by means of grained silicic acid is carried out, for instance, by supplying the liquid to be filtered by way of a collecting chamber to one or several pressure tubes in which the liquid rises until it flows over the upper ends of the tubes and from there downwards through the mass of more or less coarsely grained silicic acid contained in the annular space between the tubes and the jackets surrounding them, the filtrate escaping at the bottom of the jackets ready for use. This filtering device can be permanently mounted within a refractory chamber adapted to be heated, so that it is possible to effect the regeneration of the filtering material by steaming or by calcination in the filtering device itself, whereby all stirring devices, filter presses, suction filters, distilling and calcining ovens and the like can be dispensed with altogether.

In the drawings affixed to this specification and forming part thereof, a filtering device fit for use in practising my invention, and forming itself part thereof, is illustrated diagrammatically by way of example in vertical section.

Referring to the drawing, $a$ is the liquid supply pipe and $b$ is the collecting chamber. The liquid supplied to $b$ through $a$ rises in the tubes $c$, which may be provided in any desired number and are surrounded by jackets $d^1$, $d^2$, $d^3$. ... The annular spaces confined between the tubes and the jackets are filled almost up to the upper ends of the tubes with the more or less coarsely grained filtering material $e$. Strainers $f$ or the like at the bottom of the jackets prevent the material from dropping out. The liquid rising in the tubes $c^1$, $c^2$, $c^3$ flows over the upper edges of the tubes and then downwards through the filtering material $e$, collecting in the chamber $z$ above the bottom $b$, being tapped off at $g$. No stirring is required during filtration, the liquid flowing through the filtering material, owing to the great permeability of this latter under the action of its own gravity, so that the clear filtrate is obtained in an uninterrupted operation which can be regulated in a well known manner by suitable throttling means.

By arranging the filtering device substantially as described, the filters can be enclosed entirely; they can be made of refractory material and can be enclosed in a refractory chamber adapted to be heated. By this arrangement the regeneration of the filtering material described further below can be carried out in the filters themselves.

As shown in the drawings, the filters consisting each of a jacket $d$, tube $c$ and filtering material $e$ are all enclosed in a refractory chamber $h$, arranged after the manner of a heating oven and provided with some suitable kind of furnace $i$, a chimney $k$ and an air valve $o$. When the filtering power of the material $e$ is exhausted after some time, which usually will be about twenty hours, the mass is acted upon in the following manner:—First of all, the rest of filtrate which is still present in the tubes $c$ is tapped off through pipe $l$. The furnace is now heated and the filters are subjected to such temperature that part of the foreign matter within the mass is expelled by distillation, while the steam injected through pipe $m$, in order to further distillation, is prevented from condensing. The steam acts towards expelling the foreign matter still present in the filtering material which is condensed in the cooler $n$ inserted in the pipe $l$. When nothing but water escapes from pipe $l$, the regeneration of the filtering material is finished and the injection of steam is stopped.

In the apparatus illustrated in the drawing, the steam pipe $m$ ends in an annular pipe having a great number of perforations which act towards distributing the steam over the tubes $c$. However, steam can also be supplied in any other suitable manner, it being merely essential that its temperature be lower than the temperature of the heating material, in order that the steam be prevented from condensing and the filtering material remain dry. After cooling down, the filtering material is ready for use again. Cooling is preferably effected by introducing fresh air into the chamber through the valve $o$, the natural draught causing the hot air to pass through the chamber and to escape at $k$.

Obviously the regeneration with the aid of steam as above described will not suffice to remove all traces of foreign matter from the filtering material and it is therefore possible to clean this material from time to time by calcination. This can also be effected in a simple manner by discontinuing the injection of steam used for regeneration and thereafter raising the temperature in the chamber to such an extent that the carbonaceous matter still present in the filtering material $e$ is burnt entirely with the aid of fresh air introduced at $p$, the gases of combustion escaping at $q$.

The term "coarsely grained" as used in this specification and in the claims appended to it is intended to include grains of all sizes which in their totality do not form a powder.

We wish it to be understood that we do not desire to be limited to the exact details of construction shown and described, for obvious modifications will occur to a person skilled in the art.

We claim:—

1. The method of preparing filtering material comprising acting on a silica gel containing less than 91 per cent water so as to shape it into coarse grains before drying same and only thereafter drying the granular material.

2. The method of filtering a liquid comprising bringing such liquid into contact with coarsely grained silica gel obtained according to the method claimed in claim 1.

In testimony whereof we affix our signatures.

JOSEF HERRMANN.
MAX STAUBER.